United States Patent [19]

Heys, Jr.

[11] Patent Number: 4,796,007

[45] Date of Patent: Jan. 3, 1989

[54] MICRO-MOTION KEYBOARD

[75] Inventor: George Heys, Jr., Cambridge, Ohio

[73] Assignee: NCR Corporation, Dayton, Ohio

[21] Appl. No.: 622

[22] Filed: Jan. 5, 1987

[51] Int. Cl.[4] .......................... H04L 1/00; G06F 3/02

[52] U.S. Cl. ...................................... 341/31; 200/5 A

[58] Field of Search ........ 340/365 VL, 365 R, 365 P; 200/159 B, 5 A, 43.08, 43.04, 43.01

[56] References Cited

U.S. PATENT DOCUMENTS

| | | | |
|---|---|---|---|
| 3,846,791 | 11/1974 | Foster | 340/365 C |
| 3,950,603 | 4/1976 | Brefka | 174/52 R |
| 4,066,850 | 1/1978 | Heys, Jr. | 200/5 A |
| 4,074,088 | 2/1978 | Keough et al. | 200/5 A |
| 4,078,257 | 3/1978 | Bagley | 340/365 VL |
| 4,081,898 | 4/1978 | Taylor, Jr. et al. | 29/622 |
| 4,096,577 | 6/1978 | Ferber et al. | 364/712 |
| 4,104,728 | 8/1978 | Kasubuchi | 364/712 |
| 4,107,784 | 8/1978 | Van Bemmelen | 340/365 R |
| 4,118,858 | 10/1978 | Taylor, Jr. et al. | 29/622 |
| 4,120,041 | 10/1978 | Hayakawa et al. | 364/712 |
| 4,181,964 | 1/1980 | Moore et al. | 364/708 |
| 4,229,633 | 10/1980 | Gillilan | 200/159 B |
| 4,247,747 | 1/1981 | Swatten | 200/159 B |
| 4,311,996 | 1/1982 | Nakamura et al. | 340/711 |
| 4,349,705 | 9/1982 | Kuhfus | 340/365 R |
| 4,531,033 | 7/1985 | Schmid et al. | 200/159 B |
| 4,633,227 | 12/1986 | Menn | 340/365 VL |
| 4,644,326 | 2/1987 | Villalobos et al. | 340/365 VL |
| 4,658,104 | 4/1987 | Koizumi et al. | 200/159 B |

FOREIGN PATENT DOCUMENTS

| | | |
|---|---|---|
| 2723736 | 12/1977 | Fed. Rep. of Germany . |
| 2242909 | 3/1975 | France . |
| 1542558 | 3/1979 | United Kingdom . |
| 2149221 | 6/1985 | United Kingdom . |

*Primary Examiner*—John W. Caldwell, Sr.
*Assistant Examiner*—Tyrone Queen
*Attorney, Agent, or Firm*—Wilbert Hawk, Jr.; Albert L. Sessler, Jr.; Richard W. Lavin

[57] ABSTRACT

A keyboard assembly is disclosed comprising a waterproof portion which includes a sheet of printed key tips mounted on a cover support member overlying an indicia sheet identifying the key tips, first and second switch-matrix electrical conductors separated by an insulator sheet mounted on printed circuit board, a plurality of light-emitting diodes mounted in the printed circuit board for selectively lighting one of the key tips when operated, a plurality of I.C. circuit elements secured to the lower surface of the printed circuit board and connected to the electrical conductors forming an electrical circuit associated with the operation of the keyboard and a key operated switching mechanism extending through the keyboard to sense light emitted from elements mounted in the lower surface of the printed circuit board for controlling the operating mode of the keyboard.

6 Claims, 3 Drawing Sheets

FIG. 2
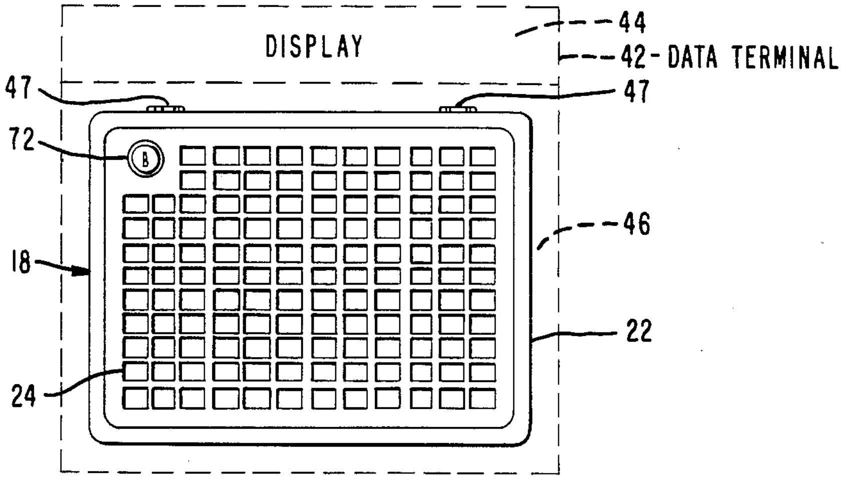
FIG. 8
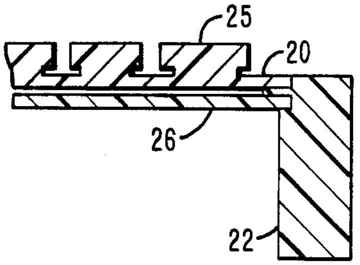
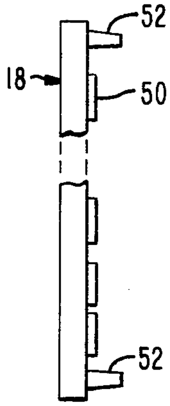
FIG. 3
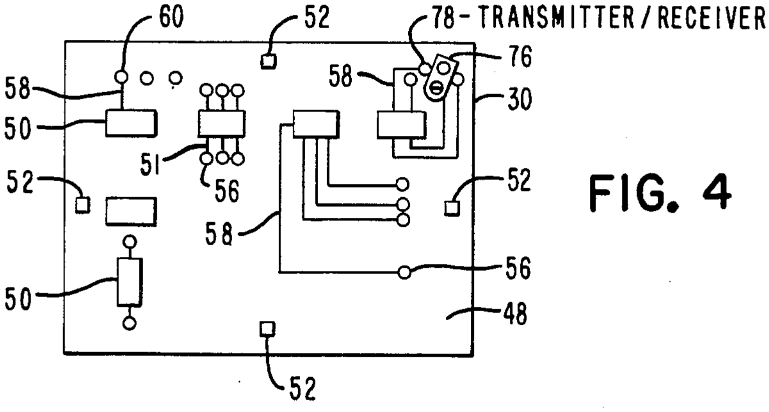
FIG. 4

MICRO-MOTION KEYBOARD

BACKGROUND OF THE INVENTION

I. Field of the Invention

The present invention is directed toward data terminal devices and more particularly to a keyboard for use in such terminal devices which is compact in construction while still providing lead-through operation of the keys.

II. Description of the Prior Art

In order to reduce the overall cost of terminal devices, low cost membrane-type keyboards have been developed for use with terminal devices. This type of keyboard includes a plurality of substrates assembled to provide a compact structure with the top substrate having portions forming the keys of the keyboard. This type of keyboard is well suited where the keyboard is required to have a large number of keys. Where the circuit elements associated with the keyboard are small in structure and the number of keys are limited such as found in ten key keyboards, such circuit elements are easily secured to the rear surface of the keyboard. When the keyboard has a large number of key positions and the circuit elements are large, such as in the case of capacitors or other types of large circuit elements, it has been the procedure to locate these elements adjacent the keyboard within the terminal. The keyboard is connected to these circuit elements by the use of a ribbon cable. This type of construction lends itself to operating problems such as EMC interference due to the required use of the ribbon cable while also increasing the cost of the keyboard. Because of the membrane-type contstruction of the keyboard, it has been difficult to provide a lighting arrangement for lead-through operation of the keyboard.

SUMMARY OF THE INVENTION

A low cost keyboard assembly is provided which includes a printed circuit switch matrix unit comprising a rigid printed circuit (P.C.) board together with all of the circuit elements associated with the operation of the keyboard mounted to the underside of the P.C. board. A layer of copper mounted on the top surface of the P.C. board is etched to provide a matrix of first electrical conductors forming one portion of the operating circuit of the keyboard assembly. A first insulating substrate having a plurality of apertures located therein is bonded to the electrical conductors. A second sheet of insulating material having a matrix of second electrical conductors secured to its underside is bonded to the first insulating substrate forming the other portion of the operating circuit. The switch matrix unit is mounted within a cover member which includes a transparent sheet of flexible material mounted on the cover member having printed thereon a plurality of key tip positions. Slidably mounted within a recessed portion of the cover member is a plastic sheet having key tip indicia printed thereon. Light-emitting diodes mounted on the underside of the P.C. board, within holes extending through the P.C. board, are selectively operated to illuminate selected key tip positions providing a lead-through operation of the key board assembly. Plated-through holes filled with an electrical conducting material are located in the P.C. board for interconnecting the circuit elements mounted on the lower surface of the P.C. board with the matrix of electrical conductors embedded in the top surface of the P.C. board. This arrangement provides an electrical path from the electrical conductors to the circuit elements upon depression of a key tip position of the insulating sheet. A key operated switching member mounted in the keyboard assembly is operated in conjunction with a plurality of light-emitting members for controlling various operating conditions of the keyboard assembly. A support member formed of a plastic material having a configuration to accommodate the switching member and the circuit elements is secured to the lower surface of the P.C. board for supporting the keyboard assembly within the terminal.

It is therefore, an object of this invention to provide a compact keyboard assembly having a large number of operating keys and which includes a plurality of large circuit elements and a light operated switching element.

Another object of this invention is to provide a compact keyboard assembly composed of a plurality of substrates and light-emitting elements which provides for a lead-through operation of the keyboard assembly.

It is a further object of this invention to provide a compact keyboard assembly which is low in cost.

BRIEF DESCRIPTION OF THE DRAWINGS

These and other objects, features and advantages of the invention, as well as the invention itself, will become more apparent to those skilled in the art in view of the following detailed description taken into consideration with the accompanying drawings wherein like reference numerals indicate like or corresponding parts throughout the several views and wherein:

FIG. 2 is a top view of the keyboard assembly of the present invention;

FIG. 3 is a partial side view of the keyboard assembly of the present invention showing the mounting of the circuit elements to the underside of the P.C. board and a portion of the supporting structure;

FIG. 4 is a plan view of the lower surface of the keyboard assembly of FIG. 1 showing the location of some of the surface mounted circuit elements, the light-emitting diodes and associated electrical conductors;

FIG. 8 is a partial side view of an alternative key tip construction.

DESCRIPTION OF THE PREFERRED EMBODIMENT

Figure 1:
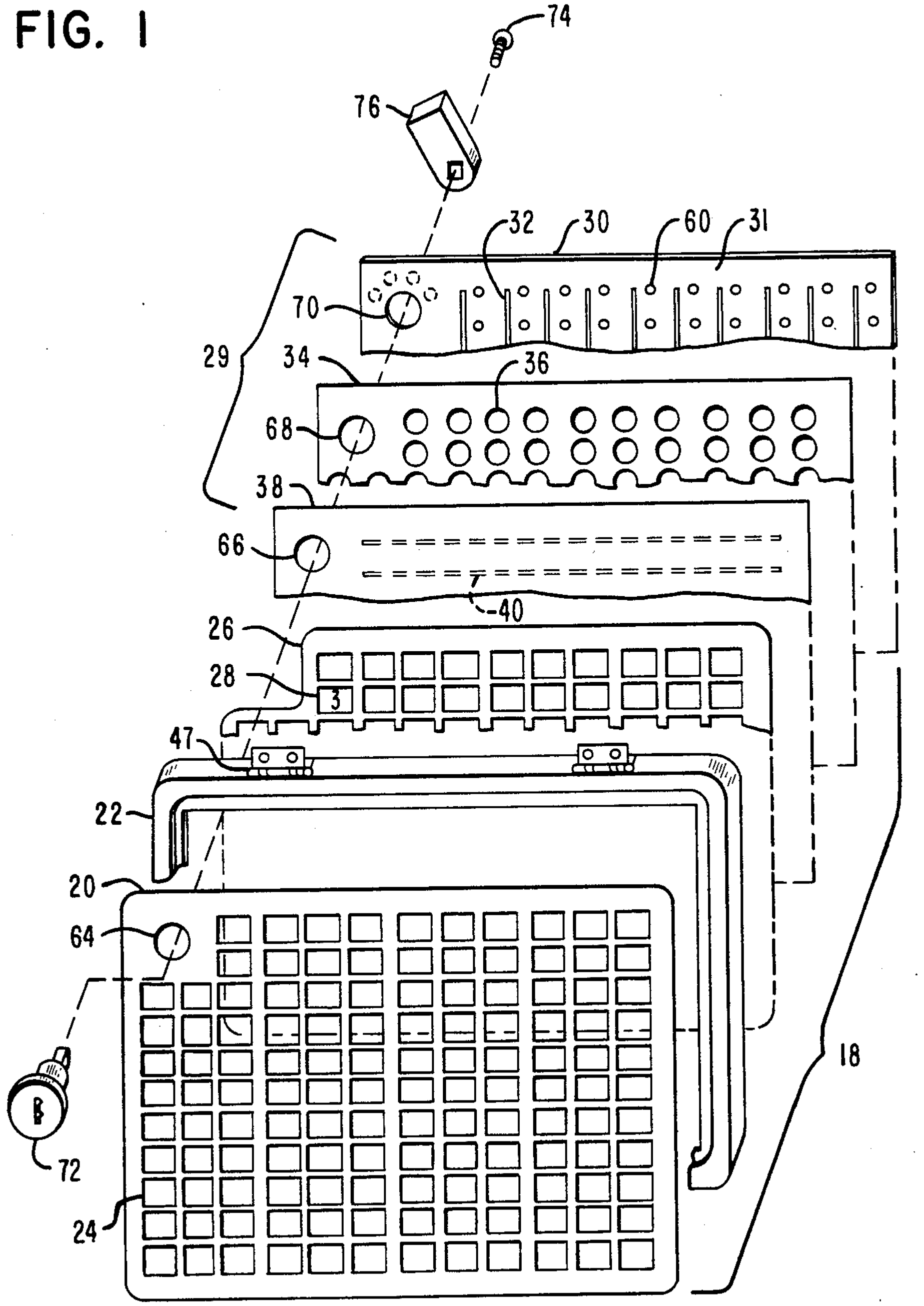
FIG. 1 is an exploded view of the keyboard assembly constructed in accordance with the present invention.

Referring now to FIG. 1, there is shown an exploded view of the keyboard assembly of the present invention, generally indicated by the numeral 18, which includes a flexible key tip sheet 20 fabricated of any type of transparent plastic material such as plasticized polyvinylchloride or urethane secured to the top portion of a cover member 22. The sheet 20 includes a plurality of key tips 24 printed thereon. As will be described more fully hereinafter, depression of any of the key tips 24 will result in the generation of binary signals representing a predetermined numerical value in a manner that is well known in the art. An alternative arrangement of a key tip construction is an array of raised key members 25 (FIG. 8) formed as part of sheet 20.

The keyboard assembly 18 further includes an indicia sheet 26 which is inserted within a recessed portion 27 (FIGS. 5 and 6) of the cover member 22 (FIGS. 1, 5 and 6) beneath the sheet 20. The sheet 26 can be of any type of opaque flexible plastic sheet construction such as polyethylene upon which a plurality of information bearing indicia 28 can be printed. When inserted within the cover member 22, each of the printed indicia 28 will be positioned beneath an associated key tip 24, which, being transparent, will be identified with the indicia. It is obvious that by inserting other sheets 26 within the recess portion 27 of the cover member 22, each with a different set of indicia printed thereon, a wide variety of key operations can be programmed using a single keyboard of the terminal device.

The keyboard assembly 18 also includes a matrix switch unit, generally indicated by the numeral 29, mounted within the cover member 22 which includes a rigid printed circuit (P.C.) board 30, having a plurality of longitudinally extending conductors 32 (FIGS. 5 and 6) embedded in the upper surface 31 of the P.C. board 30, a sheet 34 of insulating material such as mylar positioned adjacent the conductors 32, the sheet 34 including a plurality of apertures 36 each aligned with a key tip 24 in the sheet 20. The switch unit 29 further includes a flexible transparent plastic sheet 38 positioned between the sheets 26 and 34 which includes a plurality of longitudinally extending electrical conductors 40 embedded in the lower surface of the sheet 38 and extending at right angles to the conductors 32 in the P.C. board 30. In order to waterproof the matrix switch unit 29 from liquids spilled on the keyboard assembly, the switch unit 29 itself or at least the edges thereof may be sealed with a plastic or other type of waterproof material when mounted to the cover member 22 so as to prevent any liquid from entering into the area within the matrix switch unit where the conductors 32 and 40 would be exposed to the liquid's corrosive influence.

In a manner that is well known in the art, portions of conductors 32 and 40 located adjacent the same aperture 36 will make contact when the conductor 40 is moved through the aperture 36 by the depression of a key tip 24 aligned with the aperture 36. This contact generates binary signals representing the key tip 24 depressed.

Referring now to FIG. 2, there is shown, in dotted lines, a plan view of a data terminal device 42 which includes the keyboard assembly 18 and a display 44. The keyboard assembly 18 is mounted to the top cabinet surface 46 of the terminal device 42 in any conventional manner such as by hinge members 47.

Figure 5:
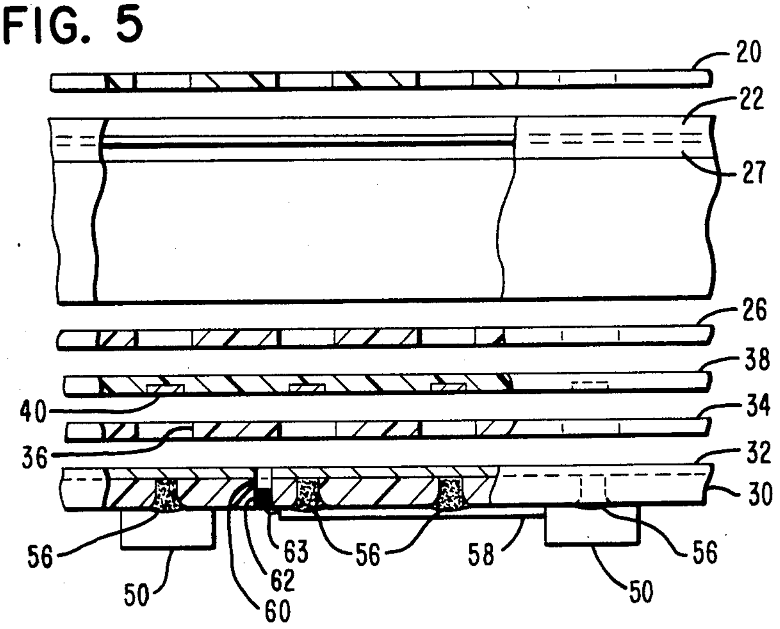
FIG. 5 is an enlarged exploded cross-sectional view of a portion of the keyboard assembly of FIG. 1 with a portion of the printed circuit board removed.
Figure 6:
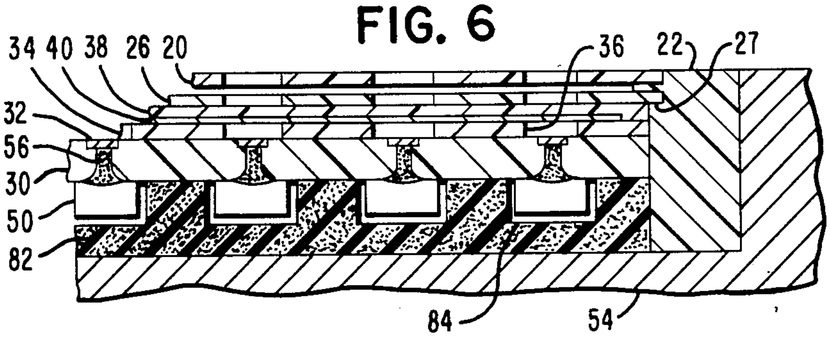
FIG. 6 is a partial cross-sectional view of the keyboard assembly mounted in the terminal cabinet.

As shown more clearly in FIGS. 3, 4 and 5, mounted to the lower surface 48 of the printed circuit board 20 are a plurality of circuit elements 50 which form part of the operating circuit of the keyboard assembly which includes the conductors 32 and 40. Also secured to the lower surface 48 of the printed circuit board 30 are a plurality of stand-off members 52 which mate with the cabinet structure 54 (FIG. 6) of the terminal device 18 to locate the keyboard assembly within the terminal device 18. As shown in FIGS. 4 and 5, the circuit elements 50 are connected to the ends of plated-through holes 56 located in the printed circuit board 30 by electrical conductors 58 which are formed by etching a layer of copper applied to the lower surface 48 of the printed circuit board 30. The plated-through holes 56 are filled with electrical conducting paste 60 and make contact with the electrical conductors 32. The paste 60 consists of a silver filled silicone material which is commercially available from the Tecknict Co. of Santa Barbara, Calif.

As shown in FIGS. 4 and 5, the plated-through holes 56 may be located adjacent the circuit elements 50 or connect directly with the leads 51 of the circuit elements 50. As shown in FIGS. 1 and 4, the P.C. board 30 further includes a plurality of apertures 60, each positioned adjacent one of the conductors 32 and in alignment with one of key tips 24 in sheet 20. Mounted in each of the apertures 60 is a light-emitting diode 62 (FIG. 5) which extends through and adjacent to the lower surface 48 of the P.C. board 30. The diodes 62 are connected to the circuit elements 50 by the conductors 63 and 58. When energized, each diode 62 will illuminate its associated key tip 24 to provide a lead-through operation of the keyboard assembly.

Figure 7:
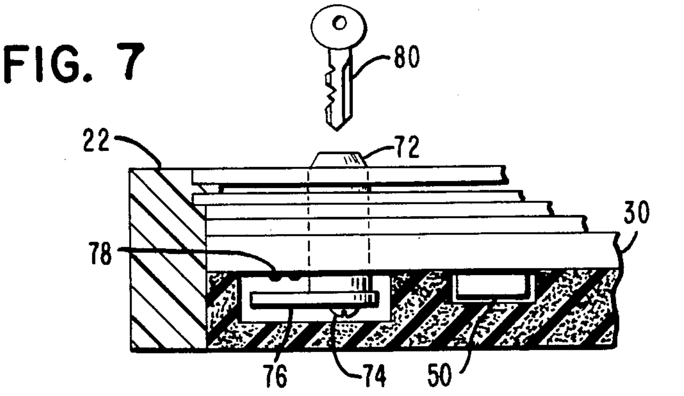
FIG. 7 is a partial side view of the key-actuated switch mechanism.

As shown in FIG. 1, located in each of the sheets 20, 38 and 34, and the P.C. board 30 are corresponding aligned apertures 64–70 inclusive in which is mounted a switch member 72 (FIG. 7), which may be key-actuated. Secured to the lower end of the switch member 72 by means of a screw 74 is an arm member 76 which is selectively positioned adjacent one of four infrared transmitter-receiver members 78 mounted to the lower surface 48 of the P.C. board 30. Each of the members 78 is connected to one of the circuit elements 50 by the conductors 58 (FIG. 4). When a key member 80 (FIG. 7) is inserted into the switch member 72, the arm 76 may be positioned in one of a number of predetermined positions adjacent one of the members 78 to reflect the infrared energy beam emitted from the member 78 back towards the member 78 enabling the member 78 to generate an electrical signal which controls the mode of operation of the terminal device. The signals generated by transmitter-receiver members 78 may, for example, turn the power supplied to the terminal device on or off or put the terminal device in a diagnostic or programming mode. The transmitter-receiver member 78 is commercially available from the Optoelectronics Division of General Instrument Corp. of Palo Alto, Calif. as Part. No. MCA7.

In mounting the keyboard assembly 18 to the terminal device 42 (FIG. 2), a plastic support member 82 (FIG. 6) is secured to the lower surface 48 of the P.C. board 30 which includes recessed portions 84 formed to accommodate the exterior dimensions of each of the circuit elements 50 mounted to the lower surface 48 of the printed circuit board 30 in addition to the arm 76 of the switch member 72. The support member 82 together with the stand-off members 52 (FIGS. 3 and 4) provides stiffness to the keyboard assembly 18 when mounted to the cabinet structure 54 of the terminal device 42. The plastic material forming the support member 82 is commercially available from the General Electric Corp. of Selkirk, N.Y. as Part No. PC180.

It will be seen that there has been provided a compact waterproof keyboard structure which provides lead-through operation of the keyboard together with a key operated switch member for controlling various operations of the keyboard. This structure does not require any external connecting wiring thus eliminating any electromagnetic interference with the operation of the keyboard.

While the principles of the invention have now been made clear in an illustrated embodiment, it would be obvious to those skilled in the art that many modifications of structure, arrangement, elements and components can be made which are particularly adapted for specific environments without departing from those principles. The appended claims are therefore intended to cover and embrace any such modification within the limits only of the true spirit and scope of the invention.

I claim:

1. A switch-matrix keyboard for use in a data terminal device comprising:

a printed circuit board having a first surface and a plurality of first apertures extending through the circuit board to a second surface of the circuit board, each aperture containing an electrically conductive material;

a transparent switch-matrix assembly secured to said first surface;

keyboard cover means for supporting said switch-matrix assembly and including a plurality of actuating portions adapted for movement to a position engaging a predetermined portion of said switch-matrix assembly enabling said switch-matrix assembly to generate electrical signals;

a plurality of electrical circuit elements mounted to the second surface of said circuit board adjacent said plurality of first apertures whereby a portion of the switch-matrix assembly engages the conductive material in each aperture enabling the circuit element to receive electrical signals from the switch-matrix assembly in response to the movement of an actuating portion of the cover means;

a plurality of light-emitting members mounted in said printed circuit board, said printed circuit board further including a plurality of second apertures extending through the circuit board, each of said light-emitting members being mounted in one of said second apertures for illuminating an associated actuating portion of said cover means when operated; and a rotatably mounted switch means mounted in said printed circuit board, said switch-matrix assembly and said cover means for generating control signals when rotated to one of a number of predetermined positions thereby enabling the keyboard for operation, said switch means including a key operated rotatably mounted support member extending through said printed circuit board and an arm member mounted to one end of said rotatably mounted support member extending in a direction parallel to the second surface of said printed circuit board, said keyboard further including a plurality of energy transmitter-receiver members mounted to said second surface of the printed circuit board adjacent said arm member whereby said arm member, when positioned adjacent to one of said transmitter-receiver members, reflects the energy outputted by said one transmitter-receiver member back towards the transmitter-receiver member enabling the transmitter-receiver member to sense the position of the arm member and to generate said control signals in response to sensing of the position of the arm member.

2. The keyboard of claim 1 in which the printed circuit board forms an open area when mounted to the terminal device, said keyboard further includes a support means secured to the second surface of said printed circuit board for supporting the printed circuit board on the data terminal device, said support means occupying the open area between the printed circuit board and the data terminal device.

3. The keyboard of claim 2 which further includes a pair of hinge members mounted to said keyboard cover means for rotatably mounting the cover means to the data terminal device.

4. A manually actuable keyboard assembly for use in a data terminal device having a top supporting surface comprising:

a switch-matrix comprising a rigid printed circuit board having a first surface in which is mounted first electrical conductors and a second surface opposite said first surface, said printed circuit board including a plurality of first apertures extending through said first and second surfaces and containing an electrical conductive material engaging said first electrical conductors and a plurality of second apertures extending through the circuit board, said keyboard further including electrical circuit elements mounted to the second surface of said circuit board adjacent said first apertures whereby a portion of the electrical circuit elements engages the conductive material enabling the circuit elements to receive electrical signals from the first electrical conductors;

an insulating member secured to the first surface of said printed circuit board and having openings therein;

a deformable membrane member secured to said insulating member and adapted for movement through said openings, said membrane member having second electrical conductors mounted adjacent to the openings in said insulating member thereby generating electrical signals upon movement of the second electrical conductors into engagement with the first electrical conductors, said printed circuit board, said insulating member and said membrane member being secured together in a watertight relationship;

a cover support assembly secured to said switch-matrix, said cover support assembly including a support member mounted adjacent said membrane member having a recessed portion extending around the perimeter of the support member;

a first sheet member positioned on said cover support assembly adjacent said recessed portion having a plurality of key tip portions located for generating a plurality of electrical signals in response to the movement of one of the key tip portions to a position engaging and depressing a portion of the membrane member;

a second sheet member positioned within the said recessed portion and having key representing indicia thereon aligned with said key tip portions;

a plurality of light-emitting members mounted in one of said second apertures and in alignment with said key tip portions for selectively illuminating an associated key tip portion when enabled; and a key operated rotatably mounted switch means extending through said support assembly and said switch-matrix for generating control signals when rotated to one of a plurality of actuated positions enabling the data terminal device for operation, said switch means comprising a key operated rotatably mounted support member extending through said cover support member and said switch matrix, said switch means further including an arm member mounted to one end of said rotatably mounted support member and extending in a direction parallel to the second surface of said printed circuit board, said keyboard assembly further including a plurality of light transmitter-receiver members mounted to said second surface of the printed circuit board adjacent said arm member whereby said arm member, when positioned adjacent to one of said transmitter-receiver members, will reflect the light outputted by said one transmitter-receiver member back towards the transmitter-receiver member enabling the transmitter-receiver member to sense the position of the arm member and generate said control signals in accordance with said position.

5. The keyboard assembly of claim 4 which further includes a plastic support member secured to the second surface of said printed circuit board for supporting the printed circuit board on the data terminal device, said plastic support member occupying the open area between the printed circuit board and the data terminal device.

6. The keyboard of claim 5 which further includes a pair of hinge members mounted to said cover support assembly and the top supporting surface of the data terminal device for rotatably mounting the keyboard assembly to the data terminal device.

* * * * *